United States Patent [19]

Kurihara

[11] Patent Number: 5,711,339
[45] Date of Patent: Jan. 27, 1998

[54] FUEL OUTFLOW PREVENTING VALVE DEVICE

[75] Inventor: Kazumasa Kurihara, Fujisawa, Japan

[73] Assignee: Nifco Inc., Yokohama, Japan

[21] Appl. No.: 723,529

[22] Filed: Sep. 30, 1996

[30] Foreign Application Priority Data

Jan. 8, 1996 [JP] Japan ................................. 8-017068

[51] Int. Cl.⁶ ........................... F16K 31/22; F16K 33/00
[52] U.S. Cl. ........................ 137/43; 137/202; 137/388; 137/433; 123/198 D
[58] Field of Search ........................... 137/43, 44, 202, 137/388, 433; 123/198 D

[56] References Cited

U.S. PATENT DOCUMENTS

| | | | |
|---|---|---|---|
| 2,770,666 | 11/1956 | Knight | 137/43 |
| 2,966,160 | 12/1960 | Forrester | 137/43 |
| 5,044,389 | 9/1991 | Gimby | 137/43 |
| 5,277,168 | 1/1994 | Kondo et al. | 137/43 |
| 5,392,804 | 2/1995 | Kondo et al. | 137/43 |
| 5,443,561 | 8/1995 | Sakata et al. | 137/43 |
| 5,522,417 | 6/1996 | Tomioka et al. | 137/43 |

FOREIGN PATENT DOCUMENTS 4-236870  8/1992  Japan.

*Primary Examiner*—George L. Walton
*Attorney, Agent, or Firm*—Kanesaka & Takeuchi

[57] ABSTRACT

A fuel outflow preventing valve device of the invention is formed of a housing, a plurality of valves, and a plurality of energizing members. The housing has a flow path, a plurality of orifices communicating with the flow path, a plurality of cavities, and a plurality of openings communicating with the cavities. Each cavity communicates with each orifice. Each valve is situated in each cavity and moves to open or close the corresponding orifice. Each energizing member is situated in each cavity to support each valve and has strength such that each energizing member can not move the valve toward the orifice to close the orifice by its own force, but each energizing member can move the valve toward the orifice to close the orifice when fluid enters into the cavity to provide buoyancy to the valve. Therefore, the fuel outflow preventing valve device has a simple structure, and each valve is prevented from being stuck to a valve seat. Also, a length of each valve in a moving direction can be shortened, and a sealing ability can be maintained for a long time.

11 Claims, 2 Drawing Sheets

FUEL OUTFLOW PREVENTING VALVE DEVICE

BACKGROUND OF THE INVENTION AND RELATED ART STATEMENT

The present invention relates to a fuel outflow preventing valve device to be attached to, for example, a fuel tank of a car. The fuel outflow preventing valve device prevents, under a normal condition, pressure increase in the fuel tank by releasing fuel vapor to an outside of the fuel tank while providing communication between an interior of the fuel tank and an atmosphere; and prevents fuel from flowing to an outside of the fuel tank when the car is turned upside down or suddenly accelerated, or a steering wheel is suddenly turned.

The above fuel outflow preventing valve device quickly releases the fuel vapor to the outside of the fuel tank to thereby prevent the pressure increase in the fuel tank. Therefore, it is desirable to make a large orifice in section.

However, in case the section of the orifice is made large, since a contacting area between a valve for opening or closing the orifice and a valve seat becomes large, a phenomenon that the valve sticks to the valve seat may take place.

As described above, under a condition where the valve sticks to the valve seat, in case the pressure of the fuel vapor in the fuel tank increases, the valve is pressed against the valve seat by the pressure of the fuel vapor. It is hard to open the orifice by moving the valve against the pressure. Therefore, generally, the diameter of the orifice is made small to decrease the contacting area between the valve and the valve seat, so that the sticking force of the valve to the valve seat is reduced.

However, in case the diameter of the orifice is made small, the fuel vapor can not be quickly released to the outside of the fuel tank.

Thus, in a conventional fuel outflow preventing device, a first valve, which opens or closes a first orifice with a large diameter disposed in a housing, is provided with a second orifice having a diameter smaller than that of the first orifice and communicating with the first orifice under a condition that the first orifice is closed by the first valve, and a second valve for opening or closing the second orifice is disposed in the first valve. Therefore, by opening the first and second orifices, fuel vapor can be quickly released to an outside of the fuel tank. In a situation that the first and second valves close the first and second orifices, respectively, even if a pressure of the fuel vapor in the fuel tank is increased due to Sticking of the first valve to a valve seat, the second valve opens the second orifice to thereby release the fuel vapor to the outside of the fuel tank. This kind of valve device is disclosed in Japanese Patent Publication (KOKAI) No. 4-236870.

However, in the conventional fuel outflow preventing valve device as described above, the first valve receives the second valve therein. Thus, in order that the first and second orifices are closed from a state that the first and second orifices are opened, or the first and second orifices are opened from a state that the first and second orifices are closed, it requires a moving stroke for opening or closing the first orifice by the first valve, and a moving stroke for opening or closing the second orifice by the second valve, so that the whole valve moving strokes become a sum of both moving strokes.

Therefore, the lengths of the first and second valves become longer in their moving directions, so that the first and second valves become large and heavy, and a responding ability of the first and second valves relative to closing or opening of the first and second orifices is inferior.

In a normal condition, since the first and second valves are laminated, valve heads and valve seats wear by friction due to vibrations. Thus, a sealing ability can not be maintained for a long time.

Also, since the valve moving strokes for opening or closing the first and second orifices are long, a liquid surface level when the fuel tank is filled up with fuel can not be raised to thereby increase a dead space, and a large amount of fuel can not be supplied to the fuel tank.

Further, since the conventional fuel outflow preventing valve device has a structure such that the second valve is received in the first valve, the structure is complicated, which may result in operational defects.

The present invention has been made to obviate the above inconveniences or drawbacks.

Accordingly, one object of the present invention is to provide a fuel outflow preventing valve device to be attached to a fuel tank, wherein a structure is simple and operational defects thereof hardly take place.

Another object of the present invention is to provide a fuel outflow preventing valve device as described above, wherein each valve is prevented from being stuck to a valve seat, and a sealing ability thereof can be maintained for a long time.

A further object of the present invention is to provide a fuel outflow preventing valve device as described above, wherein a length of each valve in a moving direction thereof is shortened to thereby minimize and lighten the fuel outflow preventing valve device.

A still further object of the present invention is to provide a fuel outflow preventing valve device as described above, wherein a large amount of fuel can be supplied to the fuel tank.

Further objects and advantages of the invention will be apparent from the following description of the invention.

SUMMARY OF THE INVENTION

A fuel outflow preventing valve device of the present invention comprises a housing provided with a plurality of cavities communicating with a flow path through orifices, and a plurality of openings communicating with the respective cavities; a plurality of valves moving in the respective cavities to open or close the corresponding orifices; and a plurality of energizing or spring members which do not close the corresponding orifices by moving the respective valves against weights thereof, but close the corresponding orifices by moving the respective valves in cooperation with buoyancy thereof.

In the fuel outflow preventing valve device of the invention, it is desirable that a section of one of the plural orifices is made smaller than that of the other orifices; a weight of one of the plural valves is made heavier than that of the other valves; or the plural cavities are disposed in the same lateral level.

DETAILED DESCRIPTION OF PREFERRED EMBODIMENTS

Hereinunder, embodiments of the present invention are described with reference to the drawings.

Figure 1:
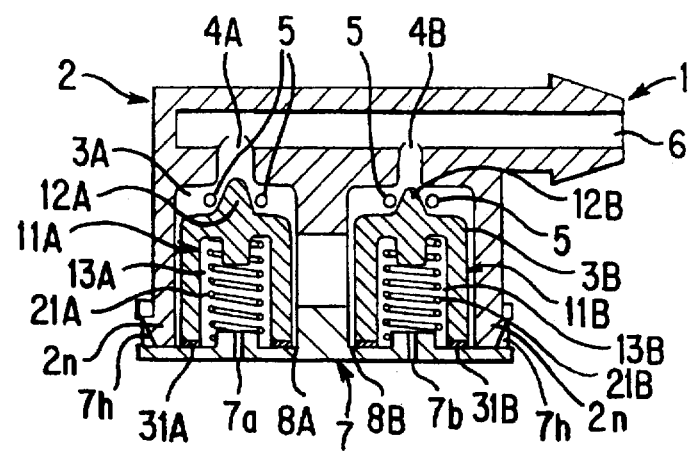
FIG. 1 is a sectional view for showing a fuel outflow preventing valve device of an embodiment according to the present invention.
Figure 2:
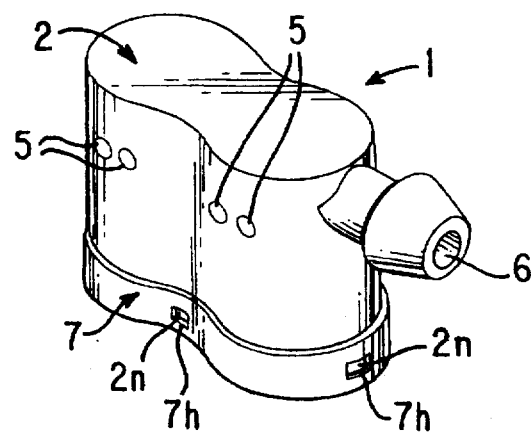
FIG. 2 is a perspective view of the fuel outflow preventing valve device shown in FIG. 1.
Figure 3:
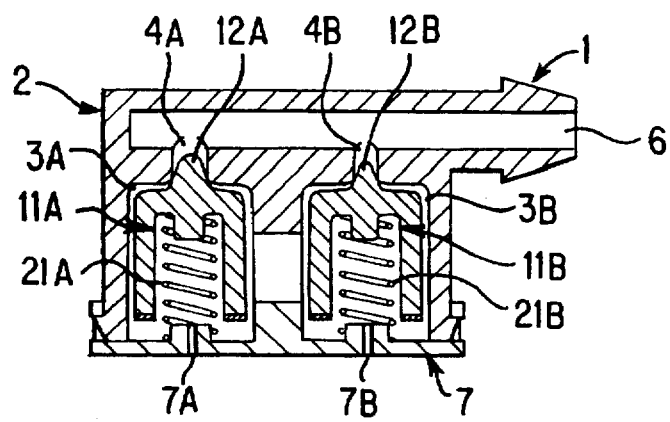
FIG. 3 is a sectional view for explaining operations of the fuel outflow preventing valve device shown in FIG. 1.
Figure 4:
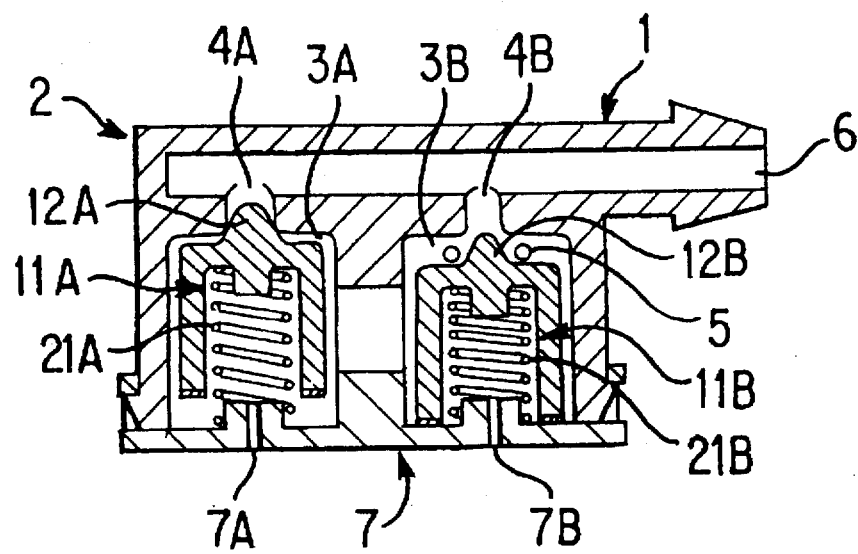
FIG. 4 is a sectional view for explaining operations of the fuel outflow preventing valve device shown in FIG. 1.

FIG. 1 is a sectional view of a fuel outflow preventing valve device of an embodiment according to the present invention;

FIG. 2 is a perspective view of the fuel outflow preventing valve device as shown in FIG. 1; and FIGS. 3 and 4 are sectional views for explaining operations of the fuel outflow preventing valve device as shown in FIGS. 1 and 2, respectively.

Incidentally, FIG. 3 shows a state where a first valve closes a first orifice, and at the same time a second valve closes a second orifice. FIG. 4 shows a state where only the first valve closes the first orifice.

In the drawings, a housing 1 is formed of a main housing portion 2 made of a polyacetal resin having rigidity and formed with dimensional accuracy; and a cap 7 made of a polyacetal resin and attached to the main housing portion 2 to close an opening thereof. The main housing portion 2 includes a plurality of engaging claws 2n disposed at a lower portion of an outer circumferential surface thereof; a first cavity 3A having a first orifice 4A with a circular section at a central portion of an upper surface of the first cavity 3A; a second cavity 3B having a second orifice 4B with a circular section smaller than that of the first orifice 4A at a central portion of an upper surface of the second cavity 3B, the second cavity 3B being located at the same level as the first cavity 3A and communicating with the first cavity 3A; a plurality of openings 5 disposed at a circumferential wall portion to communicate with the first cavity 3A and the second cavity 3B; and a flow path 6 communicating with the first cavity 3A through the first orifice 4A and the second cavity 3B through the second orifice 4B.

Also, the cap 7 includes a plurality of engaging holes 7h corresponding to the plural engaging claws 2n, the engaging claws 2n being inserted into the engaging holes 7h to thereby engage with the cap 7; a first through hole 7a as an opening communicating with the first cavity 3A; a second through hole 7b as an opening communicating with the second cavity 3B; a first annular recess 8A disposed at a position corresponding to the first cavity 3A for positioning a first coil spring 21A described later; and a second annular recess 8B disposed at a position corresponding to the second cavity 3B for positioning a second coil spring 21B described later.

A first valve 11A made of a polyacetal resin is situated in the first cavity 3A. The first valve 11A moves in an axial direction of the first cavity 3A to open or close the first orifice 4A. The first valve 11A includes a valve head 12A for opening or closing the first orifice 4A at an upper surface thereof, and a recess 13A for receiving therein a first coil spring 21A at a lower surface thereof.

A second valve 11B made of a polyacetal resin is situated in the second cavity 3B. The second valve 11B moves in an axial direction of the second cavity 3B to open or close the second orifice 4B. The second valve lib includes a valve head 12B for opening or closing the second orifice 4B at an upper surface thereof, and a recess 13B for receiving therein a second coil spring 21B at a lower surface thereof.

The first valve 11A and the second valve 11B have the same shapes and weights except for the valve heads 12A and 12B.

The first coil spring 21A as a first energizing member is set to have an energizing force such that the first coil spring 21A can not close the first orifice 4A by moving the first valve 11A against the weight thereof, but can close the first orifice 4A by moving the first valve 11A in cooperation with buoyancy applied thereto.

The second coil spring 21B as a second energizing member is set to have an energizing force such that the second coil spring 21B can not close the second orifice 4B by moving the second valve 11B against the weight thereof, but can close the second orifice 4B by moving the second valve 11B in cooperation with buoyancy applied thereto.

A first cushion 31A as a first buffer member is to prevent noises generated when the first valve 11A collides with the cap 7, and is attached to a lower surface of the first valve 11A.

A second cushion 31B as a second buffer member is to prevent noises generated when the second valve 11B collides with the cap 7, and is attached to a lower surface of the second valve 11B.

Next, operation of the fuel outflow preventing valve device is explained.

First, as shown in FIG. 1, under a normal condition where the fuel outflow preventing valve device is attached to a fuel tank, the first valve 11A falls downward by a weight thereof against the energizing force of the first coil spring 21A to thereby permit the valve head 12A to open the first orifice 4A, and the second valve lib falls downward by a weight thereof against the energizing force of the second coil spring 21B to thereby permit the valve head 12B to open the second orifice 4B.

Accordingly, fuel vapor, i.e. gasoline vapor, generated in the fuel tank is discharged through the openings 5, the first and second through holes 7a, 7b, the first and second cavities 3A, 3B, the first and second orifices 4A, 4B and the flow path 6, so that pressure increase in the fuel tank is prevented.

Then, when a car is suddenly accelerated or a steering wheel is suddenly turned, a large inertial force is generated. Due to the large inertial force, the gasoline flows from the openings 5, the first through hole 7a and the second through hole 7b into the first cavity 3A and the second cavity 3B, so that the first and second valves 11A, 11B are liable to float by the buoyancy. However, since specific gravities of the first and second valves 11A, 11B are larger than that of gasoline, the first and second valves 11A, 11B can not float by themselves. However, the first and second valves 11A, 11B can be raised with assistance of the energizing forces of the corresponding first and second coil springs 21A, 21B, so that the first and second orifices 4A, 4B can be closed by the valve heads 12A, 12B, as shown in FIG. 3.

Thus, gasoline can be prevented from flowing out of the gasoline tank.

Incidentally, when the car is returned to a normal condition and the gasoline in the housing 1 is returned to an interior of the gasoline tank through the openings 5, the first through hole 7a and the second through hole 7b, the first and second valves 11A, 11B compress the first and second coil springs 21A, 21B with the weights thereof to thereby fall downward and to open the first and second orifices 4A, 4B, as shown in FIG. 1.

As explained above, in case the first and second valves 11A, 11B open the first and second orifices 4A, 4B, the diameter of the second orifice 4B is smaller than that of the first orifice 4A. In other words, an area where the valve head 12B contacts the main housing portion 2 as the valve seat is smaller than an area where the valve head 12A contacts the main housing portion 2. Thus, a force with which the valve head 12B sticks to the main housing portion 2 as the valve seat is weaker than a force with which the valve head 12A sticks to the main housing portion 2. Therefore, as shown in FIG. 4, the second valve 11B quickly opens the second orifice 4B, so that the gasoline vapor is released to the outside of the gasoline tank and a pressure increase in the fuel tank is prevented.

Thereafter, as shown in FIG. 1, the first valve 11A also opens the first orifice 4A, so that the pressure increase in the fuel tank can be more quickly prevented.

As described above, when the first and second valves 11A, 11B fall downward to open the first and second orifices 4A, 4B, the first and second valves 11A, 11B collide with the cap 7 through the first or second cushions 31A, 31B, so that collision noises can not be generated.

As described above, according to the embodiment of the present invention, since the section of the second orifice 4B is made smaller than that of the first orifice 4A, i.e. the diameter of the second orifice 4B is made smaller than that of the first orifice 4A, a force by which the second valve head 12B sticks to the main housing portion 2 as the valve seat is weak. Thus, the second valve head 12B can easily open the second orifice 4B and can be prevented from being stuck to the main housing portion 2. Also, the first valve head 12A can be prevented from being stuck to the main housing portion 2. Therefore, the gasoline vapor can be quickly discharged to the outside of the fuel tank to prevent the pressure increase in the fuel tank. Thus, the object of the present invention can be attained.

Normally, since the first and second valves 11A, 11B are separated from the main housing portion 2 as the valve seat, the valve heads 12A, 12B and the valve seats do not wear by vibrations, so that sealing ability can be maintained for a long time.

Also, since the first and second cavities 3A and 3B are disposed in parallel at the same level, moving strokes of the first and second valves 11A, 11B can be shortened, and lengths in the moving directions of the first and second valves 11A, 11B can be decreased to thereby minimize and lighten the fuel outflow preventing valve device. Further, the responding abilities of the first and second valves 11A, 11B relative to opening and closing of the first and second orifices 4A, 4B are improved, and a dead space is minimized, so that gasoline can be filled in the fuel tank as much as possible.

Further, since the first and second cavities 3A, 3B are disposed in parallel at the same level, the fuel outflow preventing valve device has a simple structure to reduce the operational defects.

Also, since the first and second cushions 31A, 31B are provided between the cap 7 and the first valve 11A and the second valve 11B, respectively, the first and the second valves 11A, 11B collide with the cap 7 through the first and second cushions 31A, 31B to thereby prevent the collision noises.

Figure 5:
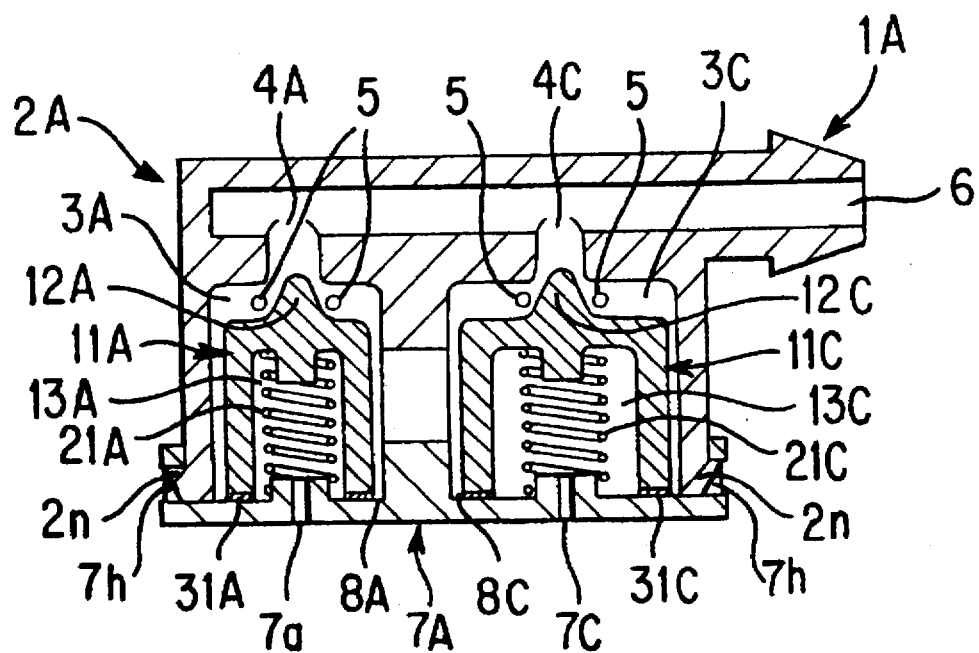
FIG. 5 is a sectional view for showing a fuel outflow preventing valve device of another embodiment according to the present invention.

FIG. 5 is a sectional view showing a fuel outflow preventing valve device of another embodiment according to the present invention, and the same portions as or portions corresponding to those shown in FIG. 1 to FIG. 4 have the same symbols, and explanations thereof are omitted.

In FIG. 5, a housing 1A is formed of a main housing portion 2A made of a polyacetal resin, and a cap 7A made of a polyacetal resin and attached to the main housing portion 2A to close an opening thereof.

The main housing portion 2A includes a plurality of engaging claws 2n; a first cavity 3A having a first orifice 4A; a second cavity 3C having a second orifice 4C with the same shape as that of the first orifice 4A at a central portion of an upper surface of the second cavity 3C, the second cavity 3C being positioned at the same level as that of the first cavity 3A and communicating with the first cavity 3A; a plurality of openings 5; and a flow path 6.

Also, the cap 7A includes a plurality of engaging holes 7h; a first through hole 7a; a second through hole 7c as an opening communicating with the second cavity 3C; a first annular recess 8A; and a second annular recess 8C disposed at a position corresponding to the second cavity 3C for positioning a second coil spring 21C described later.

A second valve 11C made of a polyacetal resin is located in the second cavity, and is moved in an axial direction of the second cavity 3C to open or close the second orifice 4C. Also, the second valve 11C is provided with a valve head 12C for opening or closing the second orifice 4C at an upper surface thereof, and a recess 13C for receiving therein a second coil spring 21C at a lower surface thereof.

The first valve 11A and the second valve 11C have the same sizes in the valve heads 12A, 12C and the lengths in a height direction, i.e. in a vertical direction in FIG. 5. However, the second valve 11C is made wider in a radial direction, i.e. a horizontal direction in FIG. 5, than the first valve 11A.

Therefore, the second valve 11C is heavier than the first valve 11A.

The second coil spring 21C as an energizing member is set to have an energizing force such that the second coil spring 21C can not move the second valve 11C against a weight to close the second orifice 4C, but the second coil spring 21 can move the second valve 11C in cooperation with buoyancy thereof to close the second orifice 4C.

A second cushion 31C as a second buffer member prevents noises generated when the second valve 11C collides with the cap 7A, and is disposed at a lower surface of the second valve 11C.

Next, though the operation of the present embodiment is the same as that of the former embodiment, an operation from a condition that the first and second valves close the first and second orifices to a condition that the first and second orifices are opened is explained hereunder.

As shown in FIG. 3, in case a car is suddenly accelerated or a steering wheel is suddenly turned, a large inertial force is generated. Due to the large inertial force, the first and second orifices 4A, 4C are closed by the valve heads 12A, 12C. From this condition, when the car is returned to a normal condition and gasoline in the housing 1A is returned to a fuel tank through the openings 5, the first through hole 7a and the second through hole 7c, the first and second valves 11A, 11C compress the first and second coil springs 21A, 21C, respectively, by the weights thereof to thereby descend to open the first and second orifices 4A, 4C, as shown in FIG. 5.

As described above, in case the first and second valves 11A, 11C open the first and second orifices 4A, 4C, the first and second orifices 4A, 4C and the valve heads 12A and 12C are stuck to each other with the same force. Namely, the first and second valves 11A, 11C are stuck to the housing 2A as a valve seat with the same force. However, the weight of the second valve 11C is heavier than that of the first valve 11A. Thus, as shown in FIG. 4, the second orifice 4C is quickly opened by the second valve 11C to release gasoline vapor to the outside of the fuel tank and to prevent the pressure increase in the fuel tank. The first orifice 4A is also opened by the first valve 11A.

Therefore, the same effect as in the former embodiment can be obtained in the present embodiment as well.

In the above embodiments, since the first coil spring 21A and the second coil spring 21B or 21C are set to provide the energizing forces such that the first orifice 4A or second orifice 4B, 4C can be closed by moving the first valve 11A or second valve 11B or 11C in cooperation with buoyancy thereof, even if a car is turned suddenly, gasoline can be prevented from flowing to the outside of the fuel tank.

Also, although the first cushion 31A and the second cushion 31B or 31C are attached to the lower surfaces of the first valve 11A and the second valve 11B or 11C, the first cushion 31A and the second cushion 31B or 31C may be disposed on the bottoms of the first annular recess 8A and the second annular recess 8B or 8C.

Further, fuel may be light oil or the like in addition to gasoline.

In the above embodiments, the first and second orifices 4A, 4B have different areas, while the first and second valves 11A, 11B have approximately the same shapes and weight; or the first and second orifices 4A, 4C have the same shape and area, while the first and second valves 11A, 11C have different sizes and weights. As a result, the second valve 11B or 11C opens the second orifice 4B or 4C faster than the first valve 11A opens the first orifice 4A. However, the first orifice and the second orifice may have the same shapes and areas, while the first valve and the second valve may have the same shapes but different weights, so that the second valve opens the second orifice faster than the first valve opens the first orifice.

Also, in the above embodiments, while the housing 2 or 2A is provided with two cavities 3A and 3B or 3A and 3C, and the valves 11A and 11B or 11A and 11C are disposed therein, respectively, the housing may have more than three cavities in which valves are provided, respectively.

In this case, it is desirable that the plural valves have the same weights, and one of the orifices has a section smaller than those of the other orifices; or the plural orifices have the same shapes and one of the valves has a weight heavier than those of the other valves. However, in case the other valves open corresponding orifices later than one valve opens the corresponding orifice, the plural orifices may have different areas and the plural valves may have different shapes and weights.

As described above, according to the present invention, a housing is provided with a plurality of cavities communicating with a flow path through orifices, respectively, and the respective cavities are provided with valves and energizing members therein, respectively. Thus, one of the valves quickly opens the corresponding orifice to thereby quickly release fuel vapor to an outside of a fuel tank and to prevent a pressure increase in the fuel tank. Thus, the desired object of the present invention can be attained.

Usually, since the plural valves are separated or situated away from the main housing portion as a valve seat, the valve heads and valve seats do not wear by vibrations to thereby maintain a sealing ability for a long time.

Also, by disposing the plural cavities in parallel, moving strokes of the plural valves are shortened, so that an ability responding to opening or closing of the orifices by the respective valves can be improved. Further, since the plural cavities are disposed in parallel, the fuel outflow preventing valve device has a simple structure to thereby reduce operational defect.

In the present invention, one of the plural orifices has a section smaller than those of the other orifices, or one of the plural valves has a weight heavier than those of the other valves. Thus, the valve has a force sticking to the valve seat weaker than those of the other valves, or the valve is separated from the valve seat with a large force, so that the orifice thereof can be easily and positively opened and the pressure in the fuel tank can be prevented from being increased.

Also, in the present invention, since the plural cavities are positioned at the same level, a length of the plural valves in a moving direction can be shortened to thereby minimize and lighten the fuel outflow preventing valve device. Further, a dead space in a fuel tank is decreased, so that fuel can be filled in the fuel tank as much as possible.

What is claimed is:

1. A fuel outflow preventing valve device comprising:
   a housing having a flow path, a plurality of orifices communicating with the flow path and situated laterally away from each other, a plurality of cavities disposed under the orifices, each cavity communicating with each orifice, at least one partition situated between the cavities so that each of the cavities is laterally separated from each other, and a plurality of openings communicating with the cavities;
   a plurality of valves, each valve being situated in each cavity to move in a direction relative to the corresponding orifice; and
   a plurality of energizing members, each energizing member being situated in each cavity at a side opposite to the orifice to support each valve thereon and having a strength such that each energizing member can only move the valve toward the orifice against a weight of the valve to close the orifice when fluid enters into the cavity through the openings and provides buoyancy to the valve, each energizing member having insufficient strength to move the valve toward the orifice to close the orifice by the weight of the valve.

2. A fuel outflow preventing valve device according to claim 1, wherein one of said orifices has a section smaller than that of the other orifice.

3. A fuel outflow preventing valve device according to claim 1, wherein one of said valves is heavier than the other valve.

4. A fuel outflow preventing valve device according to claim 1, wherein said cavities are positioned laterally at the same level.

5. A fuel outflow preventing valve device according to claim 1, wherein each valve has a valve body and a valve head, said valves being formed in the same shapes except for the valve heads.

6. A fuel outflow preventing valve device according to claim 1, wherein each valve has a valve body and a valve head, said valves having same lengths in a height direction, said valve heads having same dimensions, and one of said valve bodies being made wider than the other in a lateral direction thereof.

7. A fuel outflow preventing valve device according to claim 1, further comprising a cap to be attached to a bottom of the casing for closing the same, and cushions, each cushion being fixed to one of the valve and the cap to prevent direct contact therebetween.

8. A fuel outflow preventing valve device according to claim 1, wherein said at least one partition has a lateral hole therein to provide fluid communication between the cavities.

9. A combination comprising a fuel tank containing the fluid therein, and the fuel outflow preventing valve device according to claim 8.

10. A combination according to claim 9, wherein each valve has a valve body and a valve head, said valve bodies of the plurality of valves having same sizes and said valve heads of the plurality of valves having different sizes.

11. A combination according to claim 10, wherein said fuel outflow preventing valve device further includes a cap attached to a bottom of the casing for closing the same, and cushions, each cushion being fixed to one of the valve and the cap to prevent direct contact therebetween.

* * * * *